Aug. 9, 1938. E. W. GARD Re. 20,822
METHOD FOR DEWAXING OILS
Original Filed Aug. 21, 1933
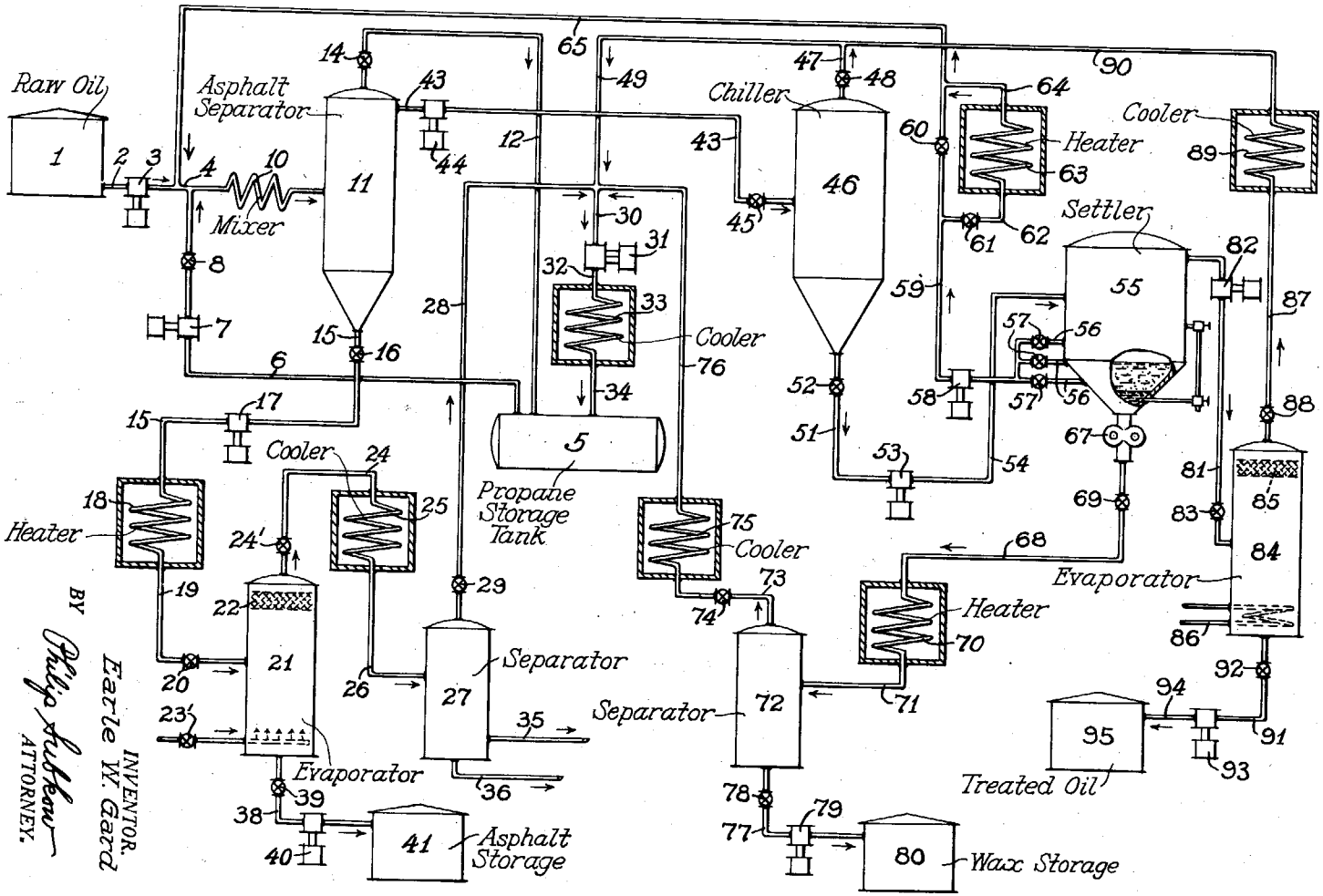
INVENTOR.
Earle W. Gard
BY Philip Subkow
ATTORNEY.

Reissued Aug. 9, 1938

Re. 20,822

UNITED STATES PATENT OFFICE 20,822

METHOD FOR DEWAXING OILS

Earle W. Gard, Palos Verdes Estates, Calif., assignor to Union Oil Company of California, Los Angeles, Calif., a corporation of California Original No. 1,989,355, dated January 29, 1935, Serial No. 686,016, August 21, 1933. Application for reissue March 13, 1937, Serial No. 130,753

16 Claims. (Cl. 196—18)

The present invention relates to a process for the separation from petroleum of those hydrocarbons which are normally solid at ordinary temperatures. In accordance with this process, I am able to separate from petroleum or mineral oil such substances as paraffin, crystalline or amorphous wax or gummy or resinous substances which may be present. While the invention is particularly adapted to the removal of paraffin, amorphous or crystalline wax or gummy or resinous substances from petroleum residues to produce lubricating oil, it may be utilized in the treatment of any other petroleum fractions where it is desirable to separate the oil from the foregoing substances.

Many crude oils from which lubricating oil is produced contain paraffin or wax. It is found associated with lubricating oil fractions of paraffin base crude oil and also with lubricating oil fractions produced from any of the mixed base and asphalt brase crude oils. The presence of wax in lubricating oil is not only of doubtful value but also limits the temperature at which lubricants containing it may be used because of congelation at low temperatures. Therefore, in the production of lubricating oils from petroleum fractions containing wax or paraffin, it is customary to remove a substantial portion of the wax or paraffin present in the oil in order to lower the temperature at which the lubricant congeals. The temperature at which an oil congeals is commonly referred to as its "pour point" and this value is usually obtained according to Method D-97-30 outlined by the American Society for Testing Materials.

One of the more successful processes suggested for the production of lubricating oil from petroleum fractions or residues which contain substances congealing at low temperatures as set forth above and to which I shall hereinafter refer as wax, consists in first diluting the wax containing oil with a light hydrocarbon solvent such as one which is vaporous at normal temperatures and pressures as, for example, propane, under a pressure sufficient to maintain the solvent in its liquid state and subsequently chilling the solution to effect precipitation of the wax. This mixture is subjected to settling, centrifuging or filtration for the purpose of removing the precipitated wax from the solution of oil and solvent. The oil solvent solution is then heated to vaporize the solvent from the oil.

The present invention relates to an improvement on the aforesaid process which has several advantages over other known processes for the separation of waxes. For example, the use of a light diluent such as propane, lowers the viscosity of the chilled mass sufficiently to facilitate the separation of the precipitated wax from the chilled solution of propane and oil. Another advantage of using this type of solvent as a diluent for the oil containing wax is that by allowing a portion of the solvent to vaporize under reduced pressure, the necessary refrigeration is obtained to chill the oil to the desired dewaxing temperature. The waxy oil is first dissolved under pressure in the light liquid hydrocarbon and then a portion of the light liquid hydrocarbon is vaporized or allowed to boil off at reduced pressure which thereby lowers the temperature of the waxy oil dissolved in the remaining solvent to a point sufficiently low to precipitate the wax. Thus, the light liquid hydrocarbon functions both as a diluent for the wax bearing oil and also as an internal refrigerant to chill the solution of oil and wax to the proper dewaxing temperature. Furthermore, this internal refrigeration may occur in the propane itself prior to its intermixture with the oil and wax.

The objection to the foregoing process has been that unless extremely long settling periods are provided, a portion of the wax is carried over with the oil solvent solution decanted from the wax settling chamber. I have observed in the foregoing process that a portion of the wax precipitated, that is, released from solution by refrigeration, settles rapidly and in a relatively short time, while the remaining portion of the wax remains in a cloudy suspension in the solution of solvent and oil and requires considerable time to settle. This is due to the different physical characteristics of the two types of wax. The first portion of the wax which settles rapidly to the bottom of the settler or decanter is a hard, heavy and solid wax. It is granular and crystalline and has a larger particle size than the remaining wax in suspension. The remaining portion of the wax is soft and slime-like and is in so fine a form of subdivision that filtering or settling is substantially impeded. This type of wax is in the nature of a gel or slime and as such offers many difficulties in its removal from the chilled solution of oil and solvent. The slimy wax forms an impervious layer upon the filter plate of the filter press which obstructs free movement of the dewaxed oil. Furthermore, the wax flocks or aggregation which are formed during the chilling operation will not readily settle out by cold settling even in the presence of propane which increases the difference in specific gravity between the solution of oil in the solvent and wax.

Thus, after a certain time of settling, there appears to be three distinct stratified layers, the first comprises the hard granular wax which settles rapidly to the bottom of the settler. Superimposed on this layer is a strata of oil and solvent containing the finely divided wax in suspension and above this is a clear solution of oil and solvent substantially free from either type of wax. In decanting the supernatant solution of oil and solvent substantially free from wax, there is a tendency for the middle layer containing the fine wax in suspension to be carried over with the oil solvent solution. The present process is aimed at the prevention of this occurrence. I have discovered that if a portion of the middle layer of oil solvent solution containing the finely divided wax in suspension is continuously withdrawn from the settling chamber, the tendency for the finely divided wax to be carried into the upper strata and thus decanted with the clear oil solvent solution is obviated. If the withdrawn portion is passed to the stream of oil entering the treating process and commingled therewith, the wax will also be commingled with the naturally occurring wax of the oil stream and will re-precipitate in the subsequent chilling of the oil solvent solution. When the chilled mixture is again passed into the settler, there will be present a larger proportion of wax so that a considerably larger amount of the wax will settle to the bottom rapidly, since the amount of wax settling rapidly to the bottom of the decanter is dependent upon the percent of wax in the mixture and the manner in which it was precipitated from solution. By the latter statement is meant that by shock chilling or rapid cooling of the solution of oil, wax and propane, a large proportion of the wax will precipitate in a form too finely divided for efficient settling and/or filtration. If the solution is cooled or chilled slowly to the final low temperature, sufficient time is allowed to permit the wax crystals to recrystallize and grow, the crystals formed in the earlier stage of cooling at the higher temperature that is, before the final low temperature of aproximately −40° F. is reached, form nuclei for the further development of crystals in the later stage of cooling to lower temperatures. I prefer to include this type of cooling in combination with other features of my invention, although I do not necessarily desire to be limited thereby. However, no matter how slowly the mixture of oil, wax and propane is cooled, there is inevitably a portion of the wax which remains in suspension in finely divided form and which requires considerable time to settle. This portion of the wax remains in the middle strata in suspension and when the oil solvent solution is decanted from the settler a portion of the finely divided wax is carried over with the oil solvent solution and thus the pour point of the lubricating oil is increased to a certain extent.

The precipitation of the mixture of oil and added wax will cause more of the finely divided wax to precipitate as such due to the added amount but the higher concentration of this finely divided wax will tend towards the agglomeration into larger particles which will then more readily settle to the bottom of the settler.

From the above discussion, it is apparent that the present invention comprises, in part, a continuous withdrawal of the solution of finely divided wax, oil and solvent at a point above the bottom outlet of the settling chamber and below the inlet of the charge of chilled oil, solvent and wax and commingling with the withdrawn mixture with the oil entering the process and subsequently chilling the mixture of oil and added wax to precipitate both the wax present in the oil and that added thereto.

When the term "light liquid hydrocarbon" is employed herein, I intend to include those hydrocarbons which are normally in the vapor state at atmospheric temperature and pressure. Such hydrocarbons include methane, ethane, propane, iso-butane, butane and mixtures thereof. These may be obtained by rectification of casinghead gasoline by the so-called stabilizing method. They are the overhead thus obtained. They are liquefied by compression and cooling in the conventional manner and are drawn off into pressure chambers where they are maintained in the liquid state until they are used. A typical analysis of such a fraction is 6.72% ethane, 72.2% propane, 19.91% iso-butane and 1.17% normal butane. It will be understood, however, that this merely illustrates the type of fraction which may be used and that the composition may vary. Since the preponderant member of this fraction is propane, I will refer to this fraction as "propane" or "liquid propane" for purposes of simplicity.

With the above discussion in mind, it will be perceived that it is a further object of my invention to provide a process for the separation of wax from oil in the production of lubricating oil wherein the oil is mixed with a hydrocarbon solvent and the mixture chilled to precipitate wax. The chilled mixture is allowed to settle so as to permit wax to settle and a portion of the solution containing wax above the bottom outlet of the settler is withdrawn and returned to the oil entering the process.

It is an object of my invention to prevent the carrying over of finely divided wax with oil in the decantation of a settled solution of oil, solvent and precipitated wax by continuously or intermittently withdrawing a portion of the solution of oil and solvent containing finely divided wax from the settling chamber at a point above the strata of more readily settling wax.

Another object of my invention resides in concentrating the oil entering the process for wax separation with finely divided wax separated during the settling of the chilled solution containing precipitated wax.

Other objects and advantages of my invention will be apparent from the following description of my invention taken from the drawing which refers to a schematic arrangement of apparatus for carrying out my invention:

Referring to the drawing, a wax or an asphalt and wax containing oil such as a residuum obtained from topping of a Santa Fe Springs crude oil to such extent as to leave fractions in the residue having a viscosity of 400 to 500 seconds Saybolt universal at 100° F. is taken from tank 1 and is withdrawn into line 2 by pump 3 passed into line 4 where it meets a stream of liquefied normally gaseous hydrocarbon solvent such as liquid propane taken from storage tank 5 via line 6 and pump 7 which forces the liquid propane through valve 8 into line 4. The amount of propane introduced into line 4 will depend upon the character of the oil and the temperatures desired in the chilling column 46 and also upon the amount of solvent desired in the settling chamber 55. Thus, the amount of solvent to be mixed with the oil should be sufficient to effect the desired chilling temperature by evaporation of solvent by release of pressure and to provide sufficient solvent in the chilled mass to provide for good and efficient settling in 55 of the precipitated wax. In the latter operation the amount of solvent should not be less than approximately 4 volumes of solvent to 1 volume of oil. In general, an initial volumetric ratio of approximately 7 to 10 volumes of solvent to 1 volume of oil will be sufficient to effect the desired lowering of temperature and to provide for efficient settling. However, a lower volumetric ratio may be employed, that is, merely sufficient to effect the desired reduction in temperature and then the mass may be supplemented with further quantities of solvent to bring the ratio up to 4 to 1 in the settling operation.

The mixture of liquid propane and oil containing asphalt and wax is passed through turbulence or mixing coil 10 into a decanter or asphalt precipitator 11 where the oil containing asphalt is precipitated and settles rapidly as a slurry of substantially pure bitumen or hard asphalt containing some oil and propane. The amount of propane introduced into the oil will also depend upon whether the oil contains asphalt or not. If it contains asphalt and it is desired to remove the asphalt at the bottom of the decanter 11 as a slurry of asphalt and propane, that is, as a mixture of substantially pure bitumen or hard asphalt and propane or as a liquid fraction of an asphalt containing propane and some oil and thus leave a portion of the asphalt in the oil solvent solution to act as nuclear bodies for the wax in the subsequent precipitation of wax by chilling. If it is desired to separate the asphalt as a liquid fraction, the volumetric ratio of propane to oil will be within a range of 0.6 to 6 to 1 depending upon the character of the oil and the degree to which it was topped. Higher volumetric ratios will precipitate the asphalt as a slurry of substantially pure bitumen and propane. It is preferable to remove as much of the asphalt present in the oil as possible in the decanter 11 and, therefore, it is necessary to employ high volumetric ratios in general from 7 to 10 volumes of propane to 1 volume of oil to accomplish this effect. A pressure of approximately 125 to 175 pounds per square inch gauge and a temperature of about 70° F. to 80° F. is maintained in the decanter or asphalt precipitator 11. The pressure in decanter 11 is controlled by means of equilibrium line 12 controlled by valve 14 and connected to the high pressure propane storage tank 5.

The asphalt precipitated in decanter 11 is withdrawn via line 15 controlled by valve 16 and is forced by pump 17 under pressure through heating coil 18 where it is heated to a sufficiently high temperature to melt the asphalt and vaporize residual propane. The heated mixture is then passed through line 19 and flashed to pressure reduction valve 20 into evaporator 21 which is operated at a lower pressure. Evaporator 21 is provided with mist extractor 22 and with a perforated pipe 23 controlled by valve 23' through which superheated steam is introduced to supply additional heat and to reduce the asphalt to the proper specification, generally, only as regards flash and fire points. The overhead from evaporator 21 passing through extractor 22 is sent through line 24 controlled by valve 24' to cooler 25 and then via line 26 to separator 27. The uncondensed propane from separator 27 is sent through line 28 controlled by valve 29 into line 30 to the suction of compressor 31 where its pressure is raised to that in the high pressure system and is then sent via line 32 to cooler 33 where it is liquefied and then runs down via line 34 into propane storage tank 5. Any condensed light oil in separator 27 is withdrawn through line 35 and condensed water through line 36. The asphalt is taken from the bottom of evaporator 21 and sent through line 38, controlled by valve 39 and pumped by pump 40 into storage tank 41.

The overflow from decanter 11 consisting of propane and oil free from asphalt but containing the wax in solution is sent through line 43 by pump 44 through pressure reduction valve 45 into decanter or chilling column 46. In chiller 46, sufficient propane is permitted to vaporize to reduce the temperature of the remaining material to a sufficiently low temperature which causes wax to precipitate from solution. It is preferable to gradually lower the temperature to a dewaxing temperature and to avoid shock chilling. The preferable rate of temperature reduction should not exceed 4° F. per minute. The temperature reduction is effected by gradually reducing the pressure in the column 46 by the proper operation of valve 48 on line 47 and compressor 31 which is connected to the column by lines 47, 49 and 30. The pressure will be gradually lowered to about 0 to 25 pounds gauge which corresponds to a temperature of approximately −40° F. to 0° F. The propane evaporating in column 46 is passed out of the top through line 47 controlled by valve 48 and then passes into lines 49 and 30 to the suction of compressor 31 where the vapors are compressed, liquefied in cooler 33 and passed to storage tank 5.

Due to the fact that sufficient time must be given to gradually chill the oil and solvent passing into the chiller 46 and to make the process continuous, a plurality of chilling colums like that shown at 46 may be provided and separated alternately. However, in batch operation merely one of such chilling columns will be sufficient. In such case, the entire material from decanter 11 may be transferred into column 46 and the chilling accomplished by controlling the operation of valve 48 on line 47.

The chilled charge in column 46 comprising oil, propane and precipitated wax is withdrawn from the bottom via line 51 controlled by valve 52 and pumped by pump 53 via line 54 into a settling device 55. In settler 55 a portion of the precipitated wax settles rapidly to the bottom of the settler, while the more flocculent, light and finely divided wax will require considerable longer time to settle. It is preferable that the introduction of the mixture via line 54 into the settler be at a point at or above the point where the fine wax remains in suspension in the mixture. This will prevent the fine wax from being carried over with the oil.

The fine wax in suspension is withdrawn from the settler 55 at a point below the inlet 54 as a mixture of wax, propane and oil. This mixture is withdrawn via either of lines 56 controlled by valves 57 and pumped by pump 58 into line 59 provided with by-pass valve 60 and passed to line 4 where it is mixed with the oil being treated. If desired, the wax in the mixture may be melted by closing valve 60 and opening valve 61 on line 62 and is then passed through heater 63 where it is heated to approximately atmospheric temperature or higher to melt the wax and passed via line 64 into line 65. If desired, a portion of the mixture may be by-passed through heater 63 and the remaining portion passed through valve 60 and the mixture commingled in line 65. The admixture of the heated portion with the unheated portion passed through valve 60 will bring the mixture to the proper temperature for admixture with the incoming oil. It is preferable to continuously withdraw the solution containing the fine wax via line 56 so that an equilibrium is maintained in the settler 55 and thus prevent the passage of the fine wax from being carried over into the oil-propane phase.

The precipitated wax at the bottom of settler 55 is withdrawn by means of gear pump 67 and passed into line 68 controlled by valve 69 and then through heater 70 where it is heated to a temperature sufficient to melt the wax and vaporize residual propane. The heated mixture is then pased via line 71 into separator 72 where vaporized propane is removed by line 73 controlled by valve 74, cooled in cooler 75 and passed via line 76 into line 30 to the suction of compressor 31 where its pressure is raised, condensed in cooler 33 and then passed into propane storage tank 5. The wax is withdrawn from the bottom of separator 72 via line 77 controlled by valve 78 and pumped by pump 79 into storage tank 80.

The overflow from settler 55 free from wax is withdrawn via line 81 and pumped by pump 82 through valve 83 into heater 84 provided with mist extractor 85 where the propane present in the oil is vaporized by the aid of steam circulated through closed steam coil 86. The vaporized propane passes out of the heater through line 87, controlled by valve 88, cooled in cooler 89 and then passes through lines 90, 49 and 30 to compressor 31 then through cooler 33 into propane storage tank 5. The dewaxed propane-free oil passes from the heater 84 by means of line 91 controlled by valve 92 and pumped by pump 93 through line 94 into storage tank 95. This oil may be subjected to the conventional acid treatment followed by neutralization and water washing. If desired, the solution of oil and propane removed from decanter 11 may be acid treated and neutralized prior to separation of the wax, or the solution of propane and oil free from wax withdrawn from the settler 55 may be likewise treated prior to the separation of the residual propane.

It is to be understood that the above is merely illustrative of preferred embodiments of my invention of which many variations may be made by those skilled in the art without departing from the spirit thereof.

I claim:

1. A process for dewaxing oil which comprises mixing said oil containing wax with a light hydrocarbon diluent, chilling said oil diluent solution to precipitate wax comprising a mixture of more readily settling wax and less readily settling wax, settling the cooled mixture to effect separation of precipitated wax, withdrawing oil diluent solution substantially free from precipitated wax from the upper part of the settling zone, withdrawing settled wax from the lower part of said zone and simultaneously with the withdrawal of said substantially wax-free oil diluent solution, withdrawing oil diluent solution containing unsettled wax from a point intermediate said upper and lower parts of the settling zone under such conditions as to prevent the unsettled wax from being carried over into the oil diluent solution substantially free from precipitated wax.

2. A process as in claim 1 in which the withdrawn oil diluent solution containing unsettled wax is returned to the oil to be dewaxed.

3. A process as in claim 1 in which the withdrawn oil diluent solution containing unsettled wax is heated and returned to the oil to be dewaxed.

4. A process as in claim 1 in which the diluent comprises a liquefied normally gaseous hydrocarbon.

5. A process as in claim 1 in which the diluent comprises propane.

6. A process for dewaxing oil which comprises mixing said oil containing wax with a light hydrocarbon solvent, chilling said oil solvent solution to precipitate said wax, said precipitated wax comprising a mixture of more readily settling wax and less readily settling wax, passing said oil solvent solution containing said precipitated wax into a settling chamber, settling said precipitated wax from said oil solvent solution in said settling chamber to permit said more readily settling wax to settle at the bottom of said settling chamber and to permit said less readily settling wax to remain in suspension in said oil solvent solution above said more readily settling wax, and continuously removing oil solvent solution containing said less readily settling wax from said settling chamber during said settling under such conditions as to prevent the less readily settling wax from being carried over into oil solvent solution substantially free from precipitated wax.

7. A process as in claim 6 in which the withdrawn oil solvent solution containing unsettled wax from the point intermediate the upper and lower parts of the settling zone is returned to the oil to be dewaxed.

8. A process as in claim 6 in which the withdrawn oil solvent solution containing unsettled wax is heated and returned to the oil to be dewaxed.

9. A process as in claim 6 in which the diluent comprises a liquefied normally gaseous hydrocarbon.

10. A process as in claim 6 in which the diluent comprises propane.

11. A process for dewaxing oil which comprises mixing said oil containing wax with a light hydrocarbon solvent, chilling said oil solvent solution to precipitate said wax, said precipitated wax comprising a mixture of more readily settling wax and less readily settling wax, passing said oil solvent solution containing said precipitated wax into a settling chamber stratifying said oil solvent solution containing precipitated wax in said settling chamber into three layers, an upper layer of oil and solvent substantially free from wax, a lower layer of the more readily settling wax, and an intermediate layer of oil and solvent containing said less readily settling wax, withdrawing said upper layer of oil and solvent from said settling chamber and simultaneously with the withdrawal of said substantially wax-free oil solvent solution, withdrawing said intermediate layer of oil and solvent containing said less readily settling wax from said settling chamber under such conditions as to prevent the less readily settling wax from being carried over into the oil solvent solution substantially free from precipitated wax.

12. A process as in claim 11 in which the diluent comprises a liquefied normally gaseous hydrocarbon.

13. A process as in claim 11 in which the diluent comprises propane.

14. A process as in claim 11 in which the intermediate layer containing the unsettled wax is returned to the mixing chamber.

15. A process as in claim 11 in which the intermediate layer containing the unsettled wax is heated and returned to the mixing chamber.

16. A process for dewaxing oil which comprises passing a stream of oil containing wax into a mixer, commingling said oil in said mixer with a liquefied normally gaseous hydrocarbon solvent, chilling said oil solvent solution to precipitate wax, said precipitated wax comprising a mixture of granular and more readily settling wax, and finely divided and less readily settling wax, passing said oil solvent solution containing said precipitated wax into a settling chamber, and in said settling chamber concentrating said finely divided wax in said oil solvent solution as an intermediate layer between a bottom layer of more readily settling wax and an upper layer of oil and solvent substantially free from wax, decanting said upper layer of oil and solvent from said settling chamber, and continuously withdrawing said concentrated intermediate layer of oil and solvent and finely divided wax from said settling chamber under such conditions as to prevent the finely divided wax from being carried over into the solution of oil and solvent substantially free from precipitated wax.

EARLE W. GARD.